No. 817,749. PATENTED APR. 17, 1906.
F. H. BROWN.
ELECTRICAL APPARATUS FOR DETERMINING THE LOCATION
OF METALLIC ORES.
APPLICATION FILED MAR. 31, 1902.
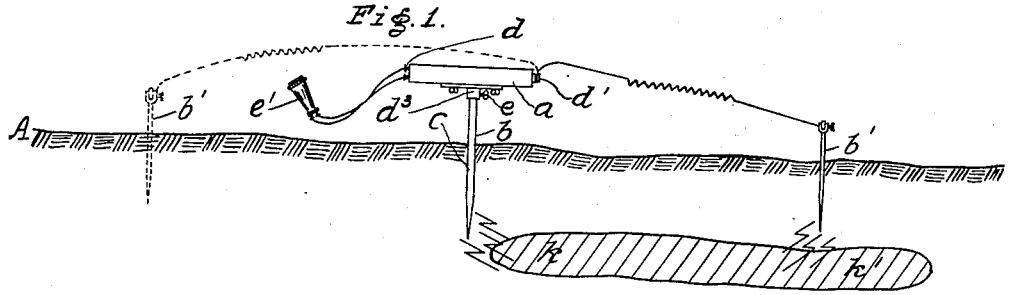
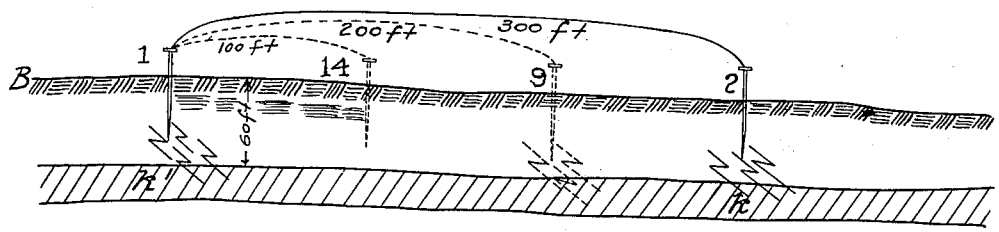
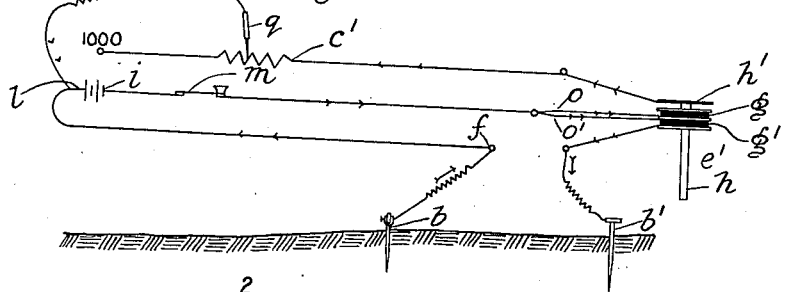
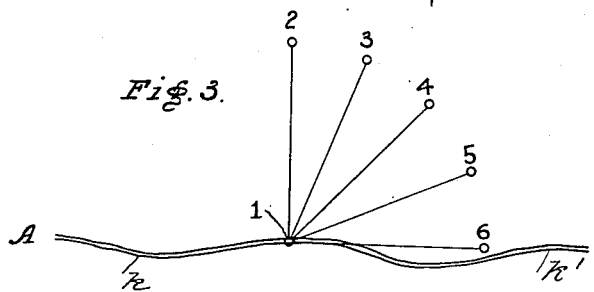
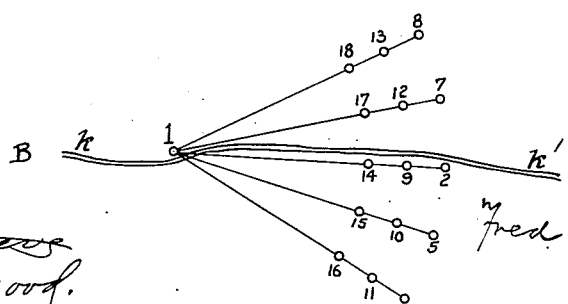
WITNESSES
INVENTOR
Fred Harvey Brown

UNITED STATES PATENT OFFICE.

FRED HARVEY BROWN, OF LOS ANGELES, CALIFORNIA.

ELECTRICAL APPARATUS FOR DETERMINING THE LOCATION OF METALLIC ORES.

No. 817,749.　　　Specification of Letters Patent.　　Patented April 17, 1906.

Application filed March 31, 1902. Serial No. 100,874.

*To all whom it may concern:*

Be it known that I, FRED HARVEY BROWN, a citizen of the United States, residing at Los Angeles, State of California, have invented and discovered a new and useful Electrical Apparatus for Determining the Location of Metallic Ores, of which the following is a specification.

This invention consists in the construction and combination of parts constituting the apparatus herein described, shown in the accompanying drawings, and finally pointed out in the appended claims.

One object of the invention is to provide an apparatus for locating metals beneath the surface of the earth by a signal given off by a differentially-wound telephone-receiver caused by sending currents of different potential through the coils on the receiver.

Another object of the invention is to furnish a device by which the resistance of the earth can be measured with battery or continuous currents without making use of the system of circuits and connections usually employed in the slide-wire type of Wheatstone bridges, thereby greatly simplifying the cost of construction and rendering this apparatus more easily understood and used and the construction of parts more readily attained than when a Wheatstone bridge is used in connection with alternating currents or extra direct electrical impulses.

Numerous difficulties are encountered in accomplishing the accurate measurements of the conductivity or resistance of the earth.

A further object of this invention is to overcome as far as possible the inaccuracies due to electrolysis and earth-currents and to furnish an apparatus in the use of which this obstacle is reduced to a nominal condition, if not entirely eliminated, and wherein a telephone-receiver is so constructed that when currents of equal potential flow through its differentially-wound coils it will indicate the ohmic resistance of two circuits, one of which incloses a different length of the earth.

I have discovered that by successively causing battery or continuous currents to traverse successive lengths of earth forming parts of one circuit and at the same time causing the same current to flow through another circuit, each of these circuits being in series, with the windings of two separate coils differentially wound on a telephone-receiver, one of these circuits being adapted to have its resistance increased or diminished, that by measuring the resistance of the circuits on the arc of the ohmic scale interposed in one of the circuits and comparing the resistances the difficulties above set forth as being heretofore encountered are in a great measure, if not entirely, eliminated, and much greater accuracy is obtained.

In the accompanying drawings, Figure I represents my apparatus in use. Fig. II is a diagrammatic view of the various parts and their connections. Fig. III is a graphic representation illustrating measurements made in order to locate the ore body and also to ascertain the depth of the ore body from the surface of the earth.

Referring to Figs. I and III, the apparatus $a$ will be stationed at any convenient point, as at $c$, Fig. I, and preferably on a rod $b$, driven into the ground or at the station marked 1 in Fig. III. Then a suitable conducting-rod, such as $b'$, as shown in Fig. I, of any suitable metal, preferably brass, is driven into the earth to form the second electrical contact therewith.

The instrument $a$ is a box containing a battery and slide-wire scale of high resistance (designated as $c'$, Fig. II) and also contains the various wires connected together, as shown in Fig. II. This box is provided with two binding-posts on one end, as shown at $d$, and on the other end is one binding-post, as shown at $d'$. The bottom of the box is provided with a brass socket $d^3$, which is adapted to inclose and be firmly attached by the thumb-screw $e$ to the brass rod $b$.

The receiver (marked $e'$) is attached by suitable conducting-cords to the two binding-posts on the end of box, (marked $d$.) The rod $b$ is electrically connected, through the socket $d^3$, to the circuit-wire inside of the box, (designated as $f$, Fig. II.) $g$ and $g'$ are the differentially-wound coils on the magnet $h$, forming part of a telephone-receiver. $h'$ is the telephone-diaphragm. $i$ is the battery, the current of which flows through the two circuits $l\,o$ and $l\,o'$, Fig. II. $q$ is a stylus adapted to contact at various points with a high-resisting wire $c'$, forming part of the circuit $l\,o$.

It is evident that when the resistance of the circuit $l\,o$ is equal to the resistance of the circuit $l\,o'$ currents of equal volume of potential will pass in opposite directions through the receiver-coils $g$ and $g'$, and no sound will then be heard in the receiver, provided the stylus-point is touched to and in contact with such a point on the high-resistance wire $c'$ as will equalize the resistance of the two circuits $l\,o$ and $l\,o'$, the receiver in this instance performing the work of the bridge-wire in the Wheatstone bridge system of measuring resistances.

In using the apparatus one of the rods, as $b$, is driven into the ground at any point, as at the point marked 1 in Fig III. The box, with the receiver attached, is then connected by the socket $d^3$ to the rod $b$ by the thumb-screw $e$, which firmly attaches it to the rod. Another rod $b'$ is driven into the ground at a dot or point, as designated at point 2, Fig. III. The rod $b'$ is then connected by a copper wire to the binding-posts $d'$, Fig. I. The battery-current is then turned on by a suitable switch $m$. The telephone-receiver is placed to the ear. The stylus is then placed in contact at various places and points on the high-resistance wire $c'$. Each time a contact is made with stylus $q$ on the high-resisting wire $c'$ a sound will be caused in the telephone-receiver until the stylus is placed on such point on the wire $c'$ which will cause the resistance of the circuit $l\,o$ to equal the resistance of the circuit from $l$ to $o'$ when such point is touched. Then these two circuits, which form part of the differentially-wound windings of the telephone-receiver $g\,g'$—in this condition the resistances of these two circuits—will be equal. The same volume of current will flow in opposite directions through $g\,g'$, Fig. II. The effect of the current on these two circuits will be to nullify each other, and no variation of the magnetism of the receiver-magnet $h$ will take place, no deflection of the diaphragm $h'$ will be caused, and therefore no sound will be heard in the receiver. These contacts of the stylus are continued until a contact is made on the wire $c'$, at which point of contact no sound will be heard in the receiver. The figure over this point of silence on the scale will indicate the resistance of the different length of earth interposed between the rods $b$ and $b'$. This resistance will then be recorded and the rod $b'$ moved and placed at the points 3, 4, 5, and 6 in Fig. III, measuring the resistances in the manner described at each of the points.

It is evident that when the rod $b'$ is placed at a point 6 it will be directly over the ore body, (marked $k$ and $k'$,) and in this instance the current will find a path of least resistance in the ore body lying directly underneath the line being measured and will pass through it to the rod at station 1. This diminished resistance will be shown on the scale $c'$ and will indicate the presence and location of ore.

B, Fig. I, represents my mode of procedure for determining the depth of the ore body from the surface. It is evident that if the instrument is placed at a point marked 1 in B, Fig. I, and the measurements taken from that point to the first point marked 2, then point marked 9, and then point marked 14 that the currents in those measurements taken from point 1 to 2 and point marked 1 to point marked 9 will deflect, reach, and pass through the ore body $k$ and $k'$, for the reason that the ore body being sixty feet from the surface and the distances being measured being respectively three hundred feet and two hundred feet that the currents will find a path of least resistance by going down to the ore body and passing laterally through it, for the reason that the two vertical resistances when added together in each instance are less than the distance through the surface of the earth; but in the measurements from point 1 to point 14 the resistance of the earth from point 14 down to the ore body and then up from the ore body through the high resisting earth to the rod at point 1 added together would amount to one hundred and twenty feet of earth resistance, which when compared with the resistance from point 14 to point 1 directly through the earth would be greater by twenty feet, and the path of least resistance would then be through the surface of the earth. In this instance the scale would indicate that the current was not passing through the ore body.

By reference to B, Fig. III, should a measurement be taken from point 1 to point 2, as described in B, Fig. I, the ore body $k$ and $k'$ would have been located. This location of ore would have been detected and determined by comparing the measurement taken from point 1 to point 2 as compared with other measurements taken from point 1 to points 5, 6, 7, and 8, B, Figs. I and III, and it is by comparing these resistances that we have ascertained that the resistance from point 1 to point 2 was very much lower than the other resistances of the same length of earth taken in the same arc of the circle. The rod $b'$ is then placed at point 9 and afterward successively placed at points 10, 11, 12, and 13, B, Fig. III. By comparing these measurements should the resistance from point 1 to point 9 be very much lower than from point 1 to points 10, 11, 12, and 13 on this two-hundred-foot arc of a circle then this would indicate that the ore body was lying directly under point 9 and that the current was still passing through it, and, further, that the resistance down to the ore body from points 9 laterally through the ore body and up to the rod at point 1 was still less than the distance across the surface—in other words, was nearer to the surface than one-half of the two hundred feet of earth being measured from the surface. Rod $b'$ is then placed at point 14 and measurements taken on the same arc of circle throughout, as indicated, as at points 15, 16, 17, and 18. By comparing the measurements taken over the arc of the circle indicated by point 14 these resistances will be found to be approximately the same, for the reason that the currents would not pass from any point on this arc down to the ore body, the path of least resistance in each instance being directly from the rod on this arc of the circle from each point through the surface of the earth. By this mode of procedure we have designated two points near to each other, as point 9 and point 14, at one of which points, as at point 9, the current passed through the ore body showing a less resistance than those measurements taken on the same arc, (indicated by point 9,) and in the other measurement taken on an arc of a circle (represented by 14) the current did not pass through the ore body. Hence this would indicate that the depth of the ore body was at some depth lying between fifty and one hundred feet of the surface. This depth can be more accurately determined by increasing and diminishing the length of measurements taken over the ore body from one hundred feet in length to two hundred, and points will be then found nearer together than points 9 and 14, in which the resistances on the same arcs when compared will show and indicate that the current is passing through the ore and the other measurements near by that it is not passing through the ore, and this distance of earth measured divided by two will indicate the distance of the ore body from the surface, for the reason that when the two vertical resistances from the surface to the ore body and from the ore body underneath the other rod to the surface, when added together, is less than the distance through the earth at the surface, then the path of least resistance will be through the ore body.

I do not desire to confine myself to the form of construction of apparatus as above described for carrying out my process, for it is evident that many different forms of construction could be formulated without departing from the spirit and the construction of parts of my invention.

Having now described an apparatus for carrying my invention into practical operation, what I claim as my invention is—

1. In an apparatus for locating metallic ores and similar substances in the earth, means for establishing two electrical circuits, one of which includes a variable resistance and the other is adapted to contain the portions of the earth to be tested, means for causing a divided current of electricity to pass over said circuits in unequal volumes, means for indicating the difference in said volumes, a contact for movably engaging with said resistance to equalize said volumes, and a telephone-receiver for determining when said volumes are equal said receiver being in the circuit having the variable resistance and connected with and forming a part of the means for indicating the difference in said volumes.

2. In an apparatus for locating metallic ores and similar substances in the earth, means for establishing two electrical circuits, one of which includes a variable resistance and the other is adapted to contain the portions of the earth to be tested, means for causing a divided current of electricity to pass over said circuits, a differentially-wound magnet in said circuits forming part of a telephone-receiver, and a contact connected with the armature of the magnet and adapted to be engaged with said resistance at different points.

3. In an apparatus for locating metallic ores and similar substances in the earth, means for establishing two electrical circuits, one of which is adapted to contain the portions of the earth to be tested, a box in the other circuit, a slide-wire scale of high resistance in said box forming a portion of said circuit, a stylus for engaging with said wire, a telephone-receiver magnet included in said circuits, the armature of which is connected with said stylus, and means for causing a current of electricity to pass over said circuits.

4. In an apparatus for locating metallic ores and similar substances in the earth, an electrical battery, a differentially-wound magnet forming part of a telephone-receiver, a divided wire for connecting one side of the battery with the respective coils of the magnet, means for connecting the other side of the battery with the earth and the armature of the magnet respectively, the means to the armature containing a variable resistance and said receiver, and means for connecting the coil of the magnet opposite the armature with the earth at a distance from the point of contact of the means from the other side of the battery.

FRED HARVEY BROWN.

Witnesses:
C. F. BROWN,
M. C. BROWN.